United States Patent
Parish

(10) Patent No.: US 8,957,164 B2
(45) Date of Patent: Feb. 17, 2015

(54) COATING COMPOSITIONS

(71) Applicant: The Sherwin-Williams Company, Cleveland, OH (US)

(72) Inventor: David M. Parish, Shaker Heights, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 13/832,485

(22) Filed: Mar. 15, 2013

(65) Prior Publication Data

US 2013/0324640 A1 Dec. 5, 2013

Related U.S. Application Data

(60) Provisional application No. 61/655,356, filed on Jun. 4, 2012, provisional application No. 61/655,815, filed on Jun. 5, 2012.

(51) Int. Cl.
*C09D 167/06* (2006.01)
*C08F 283/01* (2006.01)
*C09D 151/08* (2006.01)
*C09D 163/00* (2006.01)

(52) U.S. Cl.
CPC ............ *C09D 167/06* (2013.01); *C08F 283/01* (2013.01); *C09D 151/08* (2013.01); *C09D 163/00* (2013.01)
USPC .................... 525/447; 525/165; 525/440.071; 525/445; 523/500

(58) Field of Classification Search
None
See application file for complete search history.

(56) References Cited

U.S. PATENT DOCUMENTS 6,468,662 B1 * 10/2002 Nava .............................. 428/430
2007/0179250 A1 * 8/2007 Chen et al. .................... 525/316

* cited by examiner

*Primary Examiner* — Michael J Feely
(74) *Attorney, Agent, or Firm* — Vivien Y. Tsang; Robert E. McDonald; Deron A. Cook

(57) ABSTRACT

An unsaturated polyester resin composition comprising an unsaturated polyester, an acetoacetate functional monomer; a multifunctional di- or tri-acrylate monomer; and an allyl ether-functional monomer/oligomer, wherein the resin composition is substantially free of styrene.

23 Claims, No Drawings

COATING COMPOSITIONS

This application claims the benefit of U.S. provisional patent application No. 61/655,356, filed on Jun. 4, 2012, and 61/655,815, filed Jun. 5, 2012, the entirety of which are hereby incorporated by reference.

Applicants have found that the incorporation of reactive (meth)acrylate monomers with polymerizable vinyl esters with multifunctional di- or tri-acrylate monomers in coating compositions enhances the crosslink density and enhances the chemical resistance, heat resistance and shrink resistance of the cured coating.

In general, the coating compositions of the present invention include from about 10 weight percent to about 90 weight percent of polymerizable vinyl ester resin in a multifunctional di- or triacylate and from about 10 weight percent to about 30 weight percent of reactive (meth)acrylate. As used herein the term "reactive multifunctional acrylate" refers to compounds that have at least two acrylate functionalities that are reactive, under the conditions used to cure the coating, with at least one of the compounds involved in the curing reaction or formed by the curing reaction.

Applicants have found that exceptional results can be achieved in accordance with the present invention by use of the present reactive multifunctional acrylate with polymerizable resins comprising polymerizable vinyl ester compounds in combination with a select reactive diluent for the polymerizable vinyl ester compounds. Furthermore, applicants have discovered that unexpectedly superior performance is possible when the polymerizable vinyl ester compounds are present in the coating compositions in amounts of from about 20 weight percent to about 40 weight percent, particularly when such amounts are used in combination with a substantially styrene-free reactive diluent, preferably 1,6-hexanediol diacrylate in a vinyl ester:reactive diluent weight ratio of from about 20 weight percent to about 30 weight percent. Furthermore, applicants have found that unexpectedly superior results are generally achieved when the polymerizable vinyl ester compounds with substantially styrene-free reactive diluents and allyl-ether functional monomer/oligomer are present in the coating compositions, as more particularly defined hereinafter.

One aspect of the present invention provides an coating composition comprising polymerizable vinyl ester comprising one or more repeating units and at least one terminal vinyl carboxylate, preferably a C3-C6 vinyl carboxylate, where the ratio of the number of repeating units to the number of terminal vinyl carboxylate units is, on average in the composition, from about 1 weight percent to about 10 weight percent.

Generally, the compositions of the present invention also include an ethylenically unsaturated monomer reactive with the polymerizable vinyl ester and compatible with the reactive diluents (multifunctional di- or tri-acrylate such as HDDA). In certain aspects of the present invention, the reactive diluent comprises 1,6-hexanediol diacrylate and the resin is substantially free of styrene. By "substantially free of styrene" or "substantially styrene-free" means that the resin composition is free of styrene to less than 0.5 weight percent styrene.

Optionally, the present compositions also include a curing catalyst, activator and filler.

DESCRIPTION

One of the important active components of the present invention is the reactive acetoacetate functional monomer, having dual functionality to attach to a polymer backbone at the acetoacetoxy end, as well as be available for further reaction and crosslinking at the (meth)acrylate end. In certain aspects of this invention, the acetoacetate functional monomer is acetoacetoxyethyl methacrylate, commonly referred to as AAEM, having the following formula: CH2=C(CH3)-C(O)—OCH2CH2O—C(O)—CH2-C(O)CH3. Examples of other monomers that can be contemplated include acetoacetoxyethyl acrylate, acetoacetoxypropyl (meth)acrylate, allyl acetoacetate, acetoacetoxybutyl (meth)acrylate, 2,3 -di(acetoacetoxy)propoyl (meth)acrylate and the like. It can be appreciated by one skilled in the art that the acetoacetate functional monomer can also be multifunctional.

Further in terms of active components, the present compositions comprise at least one polymerizable compound, preferably in the form of a resin. Although the remainder of this specification will refer to compositions based on vinyl ester resins, it will be appreciated by those skilled in the art that the descriptions contained herein with respect to vinyl ester resins can be adapted for use in connection with other types of unsaturated polyester resins.

The present compositions comprise at least one polymerizable vinyl ester compound and optionally but preferably a reactive diluent for the polymerizable vinyl ester compound. Other active components that are included in certain preferred embodiments include, but are not limited to, catalyst (preferably a free-radical catalyst), chain transfer agent, inhibitor (preferably a free-radical inhibitor), activator, promoter, cross linking agent and coupling agent. In terms of inactive components, it is desirable in certain embodiments to include in the composition filler, non-reactive diluent, thixotropic agent, antifoaming agents, wetting agents, and mildewcides.

It is contemplated that the relative proportions of the components included in the present compositions may vary widely depending on numerous factors, such as for example the contemplated environment of use, the desired strength of the bond to be formed, the particular materials to be bonded, and other factors. Nevertheless, the preferred aspects of the present coating compositions comprise from about 25 weight percent to about 35 weight percent of polymerizable vinyl ester compound.

As described above, the present compositions preferably contain polymerizable vinyl ester compound in the form of vinyl ester resin, which includes reactive diluent. Although the relative amounts of reactive diluent of vinyl ester may vary widely within the scope hereof, it is generally preferred that the vinyl ester resin comprise from about 25 weight percent to about 30 weight percent, on the basis of the total weight of the resin, of reactive diluent, with the balance preferably consisting essentially of polymerizable vinyl ester compound. In certain embodiments, the coating compositions can comprise from about 30 weight percent to about 35 weight percent of vinyl ester resin. Other polyester resins useful for this invention include novolac polyesters and isopthalic polyesters.

The Polymerizable Vinyl Ester Compound

It is contemplated that known methods for formation of polymerizable vinyl ester compounds and resins can be adapted in view of the teachings contained herein to form compounds and resins in accordance with the present invention, and all such materials are considered to be within the scope hereof. In one embodiment, the polymerizable vinyl ester of the present invention is formed by the reaction of a dihydric compound with an ethylenically unsaturated carboxylic acid, anhydride or alcohol, usually with the use of a polymerization inhibitor to prevent the vinyl ester resin from gelling. In view of the teaching contained herein, it is believed that vinyl ester resin in accordance with the present invention may be prepared by any of the methods disclosed in any of the following patents, each of which is incorporated herein by reference: U.S. Pat. No. 5,456,947 to Parish and U.S. Pat. No. 5,549,969 to Parish, both assigned to Fibre Glass-Evercoat Company, Inc.

The vinyl ester resin can be based on the reaction of bisphenol A (or bisphenol F or bisphenol S) and an ethylenically unsaturated diacid or anhydride. Other suitable unsaturated polyester resins which can be utilized in the present invention are well known and include products of the condensation reaction of low molecular weight diols, (that is, diols containing from about 2 to 12 carbon atoms and desirably from 2 to 6 carbon atoms) with dicarboxylic acids or their anhydrides containing from 3 to 12 carbon atoms and preferably from 4 to 8 carbon atoms provided that at least 50 mole percent of these acids or anhydrides contain ethylenic unsaturation. Examples of diols include 1,2-propylene glycol, ethylene glycol, 1,3-propylene glycol, diethylene glycol, di-1,2-propylene glycol, 1,4-butanediol, 1,6-hexanediol, neopentyl glycol, and the like or mixtures thereof. Acids useful for this invention include fumaric acid, itaconic acid, terephthalic acid, maleic acid and anhydrides thereof. Often, mixtures of acids and/or anhydrides are utilized with the preferred acids or anhydrides and such compounds include phthalic anhydride, isophthalic acid, terephthalic acid, adipic acid, glutaric acid, and the like, catalyzed by compounds such as organotitanates and organo tin compounds such as tetrabutyl titanate or dibutyl tin oxide, and the like.

Vinyl ester resins can also be prepared by reacting epoxy resins such as the addition products of 1-chloro-2,3-epoxypropane with 2,2'-bis(4-hydroxyphenyl)propane with either methacrylic or acrylic acid.

An epoxy vinyl ester can be prepared by reacting the polyepoxide and the acid or derivative thereof in appropriate amounts, generally with heating and in the presence of a catalyst, such as a trivalent chromium salt, as for example $CrCl_3$; or a phosphine; alkali, onium salt; or a tertiary amine, for example, tris(N,N-dimethylaminomethyl phenol). Optionally, the epoxy vinyl ester resin can be formed in the presence of a non-resinous, substantially styrene-free vinyl monomer. The resulting product, which is a combination of the polymerizable vinyl ester and reactive diluent, will, in such an instance, constitute what is referred to as an "epoxy vinyl ester resin."

Examples of epoxy compounds which may be used in such formation reactions include but are not limited to those found in bisphenolic type epoxy resins, epoxy novolac type resins, amine type epoxy resins, copolymerized epoxy resins, multifunctional epoxy resins and the like. Preferably the epoxy used to form the present polymerizable vinyl ester has about 2 to about 3 of an average number of epoxy groups in the molecule.

The bisphenolic type epoxy resin compounds which may be used include, but are not limited to, those found in bisphenol A, F and S type epoxy resins, each of such compounds preferably having 2 glycidyl groups in its molecule. Commercially available examples of bisphenol A type epoxy resin include those available from Ashland Inc. under the trade designation DERAKANE® 411 epoxy vinyl ester resin. Commercially available examples of bisphenol F type epoxy resins and bisphenol S type epoxy resins may also be used.

Epoxy novolac type resin compounds may also be used, and such resins are exemplified by phenolic novolac, cresolic novolac, aliphatic, alicyclic or monocyclic epoxy resins. Commercially available example of a novolac epoxy-based vinyl ester is Ashland Inc.'s DERAKANE® MOMENTUM 470 epoxy vinyl ester resin.

Aliphatic type epoxy resin compounds may also be used, and such resins include, among others, hydrogenated bisphenol A type epoxy resin having 2 glycidyl groups in its molecule.

Alicyclic epoxy type resin compounds may also be used, and such resin compounds include, among others, alicyclic diepoxyacetal, dicyclopentadiene dioxide and vinylcyclohexene dioxide and the like, which have 2 epoxy groups in the molecule. Such epoxy resin compounds having one epoxy group in the molecule includes vinylhexene monoxide, glycidyl methacrylate and the like.

Monocyclic epoxy type resin compounds may also be used, and such resin compounds include, among others, resorcinol diglycidyl ether, diglycidyl terephthalate and the like.

Amine type epoxy resin compounds may also be used, and such resin compounds include, among others, compounds having 4 glylcidyl groups in the molecule.

These epoxy resins type compounds can be used alone or in combination. The average number of glycidyl groups in the molecule of the epoxy resin is preferably from about 1 to about 6, more preferably from about 2 to about 4, and even more preferably from about 2 to about 3.

The Reactive Diluent

In general, it is contemplated that the teachings of the present invention can be used with great advantage in connection with any one of the large number of known reactive diluents, particularly reactive monomers. Example of reactive diluents which may be use in connection with the broad teachings hereof include, multifunctional (meth)acrylate monomers such as 1,4-butanediol diacrylate (BDDA), 1,6-hexanediol diacrylate (HDDA), diethylene glycol diacrylate, 1,3-butylene glycol diacrylate, neopentyl glycol diacrylate, cyclohexane dimethanol diacrylate, dipropylene glycoldiacrylate, ethoxylated bisphenol A diacrylate, trimethylolpropane triacrylate, pentaerythritol triacrylate, pentaerythritol tetraacrylate and their related (meth)acrylate derivatives. The preferred concentration of multifunctional (meth)acrylate in the present invention is about 25 weight percent to about 30 weight percent.

While it is contemplated that the amount of reactive diluent relative to the amount of polymerizable vinyl ester in the composition may vary widely depending on numerous factors particular to each application and contemplated use, it is generally preferred that the vinyl ester:reactive diluent weight ratio is from about 1.22 to about 1.0, and optionally, the polymerizable vinyl ester is soluble in the reactive diluent.

Initiator

The resin composition of this invention may be cured by a number of free-radical initiators, including peroxide initiators. Suitable peroxide initiators include diacylperoxides, hydroperoxides, ketone peroxides, peroxyesters, peroxyketals, dialkyl peroxides, alkyl peresters and percarbonates. Examples of these peroxides include methyl ethyl ketone peroxide (MEKP), benzoyl peroxide (BPO) and cumene hydroperoxide (CHP). Combinations of two or more peroxides may be used to cure the resin. Azo-type initiators include azobisisobutyronitrile (AIBN) and related compounds. These initiators are preferably used in the range of about 1-3 percent by weight. These resins may also be cured by irradiation with ultraviolet light or electron beam.

Allyl Ether-functional Monomer/Oligomer

The allyl ether monomer/oligomer provides the oxidative drying (as an oxygen scavenger) of the binder on the surface of the article so that the surface is not tacky. Suitable allyl ether monomers/oligomers with allyl functionality may be obtained from Sartomer, which offers an allyl-functional aliphatic urethane oligomer (CN9102, Sartomer Company Inc.).

Results

Chemical resistance of a standard styrenated vinyl ester resin as compared to the substantially styrene-free vinyl ester resin of the invention are tested, with results as follows:

| Chemical | Styrene containing Vinyl Ester | Substantially Styrene Free Vinyl Ester |
|---|---|---|
| MTBE | 1.86% weight gain | .885% weight gain = 110% better |
| Xylene | 23.285% weight gain | 2.765% weight gain = 742% better |
| Toluene | Ended@24days(5.65% wt gain) | At that time frame 0.29% weight gain = 1.848% better |
| Ethanol | 12.185% weight gain | 6.68% weight gain = 82.41% better |
| Methanol | 72 hour exposures - 3.17% weight gain | 2.60% weight gain = 22% better |
| Sodium Hypochlorite | @147 days exposure - 1.435% weight loss | @147 days exposure - 1.025% weight loss = 40% better |

Further, hardness and abrasion resistance of the substantially styrene-free vinyl ester resin is much improved over the styrenated vinyl ester, which is also indicative of higher temperature resistance of the polymer.

What is claimed is:

1. An unsaturated polyester resin composition comprising:
   (1) an unsaturated polyester;
   (2) an acetoacetate functional monomer;
   (3) a multifunctional di- or tri-acrylate monomer; and
   (4) an afly ether-functional monomer/oligomer, wherein the allyl ether-functional monomer/oilgomer is an allyl ether-functional aliphatic urethane oligomer:
   wherein the resin composition is substantially free of styrene.

2. The resin composition as defined by claim 1 wherein the concentration of the unsaturated polyester is from 10 weight percent to 90 weight percent.

3. The resin composition as defined by claim 1 wherein the unsaturated polyester has a weight average molecular weight of less than 1000.

4. The resin composition as defined by claim 1 wherein the unsaturated polyester is derived from the dihydric alcohol of a group consisting of bisphenol A, ethylene glycol, 1,2-propylene glycol, 1,3-propylene glycol, 1,6-hexanediol, 1,4-butanediol, diethylene glycol, di-1,2-propylene glycol, neopentyl glycol, and mixtures thereof.

5. The resin composition as defined by claim 1, wherein the unsaturated polyester is derived from a bisphenolic type epoxy compound.

6. The resin composition as defined by claim 1, wherein the unsaturated polyester is derived from an epoxy novolac.

7. The resin composition as defined by claim 1, wherein the unsaturated polyester is derived from an aliphatic epoxy resin or an alicyclic epoxy resin.

8. The resin composition as defined by claim 1 wherein the allyl ether-functional monomer/oligomer is from 20 weight percent to 30 weight percent of the resin composition.

9. The resin composition as defined by claim 1 wherein the concentration of the acetoacetate functional monomer is from 1 weight percent to 10 weight percent of the resin composition.

10. The resin composition as defined by claim 1, wherein the acetoacetate functional monomer is selected from the group consisting of acetoacetoxyethyl methacrylate acetoacetoxyethyl acrylate, acetoacetoxypropyl (meth)acrylate, allyl acetoacetate, acetoacetoxybutyl (meth)acrylate, and 2,3-di(acetoacetoxy)propoyl (meth)acrylate.

11. The resin composition as defined by claim 1 wherein the multifunctional diacrylate monomer is 1,6-hexanediol diacrylate.

12. The resin composition as defined by claim 11. wherein the concentration of the multifunctional diacrylate is from 25 weight percent to 30 weight percent of the resin composition.

13. The resin composition as defined by claim 1, wherein the unsaturated polyester is based on an ester selected from the group consisting of a vinyl ester, a novolac ester, and isopthalic ester, or mixtures thereof.

14. An unsaturated polyester resin composition comprising: (1) an unsaturated polyester derived from a dihydric alcohol; (2) an acetoacetate functional monomer; (3) a multifunctional di- or tri-acrylate monomer and (4) an allyl ether-functional monomer/oligomer, wherein the allyl ether-functional monomer/oligomer is an allyl ether-functional aliphatic urethane oligomer; wherein the resin composition is substantially free of styrene.

15. The resin composition as defined by claim 14 wherein the concentration of the unsaturated polyester is from 10 to 90 percent by weight.

16. The resin composition as defined by claim 14 wherein the unsaturated polyester has a weight average molecular weight of less than 1000.

17. The resin composition as defined by claim 14 wherein the unsaturated polyester is derived from the dihydric alcohol of a group consisting of bisphenol A, ethylene glycol, propylene glycol, 1,6-hexanediol and 1,4-butanediol.

18. The resin composition as defined by claim 14 wherein the allyl ether-functional monomer/oligorner is from 20 to 30 percent by weight of the resin composition.

19. The resin composition as defined by claim 14 wherein the concentration of the acetoacetate functional monomer is from 1 to 10 percent by weight of the resin composition.

20. The resin composition as defined by claim 14, wherein the acetoacetate functional monomer is selected from the group consisting of acetoacetoxyethyl methacrylate acetoacetoxyethyl acrylate, acetoacetoxypropyl (meth)acrylate, allyl acetoacetate, acetoacetoxyhutyl (meth)acrylate, and 2,3-di(acetoacetoxy)propoyl (meth)acrylate.

21. The resin composition as defined by claim 14 wherein the multifunctional diacrylate monomer is 1,6-hexanediol diacrylate.

22. The resin composition as defined by claim 14 wherein the concentration of the multifunctional diacrylate is from 25 to 30 percent by weight of the resin composition.

23. The resin composition as defined by claim 14, wherein the unsaturated polyester is based on an ester selected from the group consisting of a vinyl ester, a novolac ester, and isopthalic ester, or mixtures thereof.

* * * * *

UNITED STATES PATENT AND TRADEMARK OFFICE
CERTIFICATE OF CORRECTION

| | |
|---|---|
| PATENT NO. | : 8,957,164 B2 |
| APPLICATION NO. | : 13/832485 |
| DATED | : February 17, 2015 |
| INVENTOR(S) | : David M. Parish |

Page 1 of 1

It is certified that error appears in the above-identified patent and that said Letters Patent is hereby corrected as shown below:

In the Claims

Claim 1, Column 5, Line 36, delete "afyl", insert --allyl--.

Signed and Sealed this
Twenty-third Day of June, 2015

Michelle K. Lee
*Director of the United States Patent and Trademark Office*